Patented Sept. 1, 1953

2,650,926

UNITED STATES PATENT OFFICE 2,650,926

HALOGENATED AMINO-ANTHRAQUINONYL-OXDIAZOLES

Frederic B. Stilmar, Wilmington, Del., assignor to E. I. du Pont de Nemours and Company, Wilmington, Del., a corporation of Delaware No Drawing. Application November 22, 1950, Serial No. 197,181

4 Claims. (Cl. 260—307.5)

This invention relates to new compounds of the oxdiazole series and more particularly to halogenated anthraquinonyl oxdiazoles which are fast red pigments and vat colors.

It is well known that anthraquinone vat dyes in general exhibit a high degree of light fastness and are of particular value in the dyeing of cotton. Many of these compounds are also valuable as pigments for use in paints and lacquer finishes. Although there are known certain red anthraquinone vat dyes of suitable light fastness and desirable shade, these are less common and in general more difficult to obtain than is the case with vat dyes of other colors.

In U. S. Patent No. 2,464,831, I have disclosed the production of 2,5-di (1'-amino-2'-anthraquinonyl)-1,3,4-oxdiazole, which is a red vat color having desirable fastness properties when applied to cotton and related fibers. The halogen derivatives of this compound are not readily prepared by ordinary processes. For example, when the oxdiazole referred to above is chlorinated in nitrobenzene, the starting material is practically completely decomposed.

It is an object of this invention to produce new and desirable bright red pigments and vat colors which possess excellent strength and light fastness, and more particularly to produce diaminoanthraquinonyl oxdiazoles in which one or both the anthraquinonyl nuclei contains chlorine or bromine as a substituent in the 4' position.

The new pigments and dyes which I have discovered have the following formula:

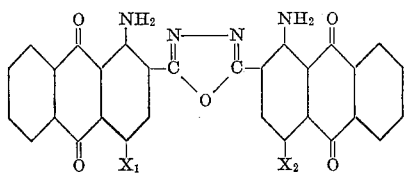

in which $X_1$ is a member of the group consisting of chlorine and bromine and $X_2$ is a member of the group consisting of chlorine, bromine and hydrogen. They are thus 2,5-di (1'-amino-2'-anthraquinonyl)-1,3,4-oxdiazoles which carry in at least one of the anthraquinone radicals in the 4' position a substituent from the group consisting of chlorine and bromine. The preferred compounds are members of the group consisting of the 4'-monochloro-, the 4',4''-dichloro-, and the 4',4''-dibromo- derivatives of 2,5-di (1'-amino-2'-anthraquinonyl)-1,3,4-oxdiazole. These compounds are fast red pigments and vat dyes of desirable shade. They are of particular value as pigments, as they exhibit unusual brightness when employed in this form.

To prepare the chlorine compounds of this invention without substantial decomposition, it is necessary to use a relatively mild chlorinating agent such as N,N - dichloro - p - toluenesulfonamide or N,N-dichlorobenzenesulfonamide instead of using free chlorine. It is also desirable to select a reaction medium in which the reaction proceeds with moderation. The degree of halogenation may be controlled by the choice of medium. For example, when 2,5-di (1'-amino-2'-anthraquinonyl)-1,3,4-oxdiazole is chlorinated by means of N,N-dichloro-p-toluenesulfonamide a monochloro derivative is obtained if the reaction is carried out in trichlorobenzene, whereas the 4',4''-dichloro derivative results from the use as a reaction medium of a 5:1 mixture of nitrobenzene and trichlorobenzene.

The bromine derivatives of the amino-anthraquinonyl oxdiazole may be formed without appreciable decomposition by the reaction between the unhalogenated oxdiazole and elemental bromine. Other brominating agents, such as N-bromo-succinimide, may also be used.

The following examples are illustrative of the invention. The parts used are by weight.

Example 1

20 parts of 2,5-di (1' - amino - 2' - anthraquinonyl)-1,3,4-oxdiazole prepared according to the procedure shown in U. S. Patent No. 2,464,831 are mixed with 500 parts of nitrobenzene and 100 parts of trichlorobenzene and are heated to 175–180° C. While the mixture is maintained at this temperature, 40 parts of N,N-dichloro-p-toluenesulfonamide are added gradually over a period of 30 minutes. The suspension is held at 175–180° C. for an additional 30 minutes, after which the bright red crystals are filtered off and washed with alcohol. The product is an unusually bright scarlet red, and dyes cotton bright red shades from a bluish-red vat. 14 parts of product are obtained. Analysis shows it to contain 11.5% chlorine, the theoretical amount for a dichloro derivative being 12.2%. Treatment of the product with a hot mixture of sulfuric acid and boric acid causes a great deal of hydrolysis, indicating that the chlorine is substituted in a position on the anthraquinone nucleus that is para to the amino group and hence that the product is 2,5-di (1'-amino-4'- chloro-2'-anthraquinonyl)-1,3,4-oxdiazole, having the formula:

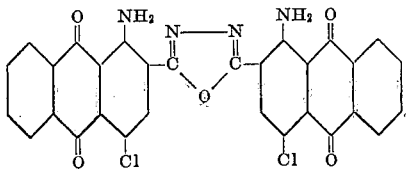

The same reaction takes place when N,N-dichlorobenzenesulfonamide is used as a chlorinating agent in place of the N,N-dichlorotoluenesulfonamide.

*Example 2*

Five (5) parts of 2,5-di (1'-amino-2'-anthraquinonyl)-1,3,4-oxdiazole are mixed with 125 parts of trichlorobenzene. The mixture is heated to 175–180° C. and 10 parts of N,N-dichloro-p-toluenesulfonamide are added gradually, after which the temperature is raised to 190° C. The product is filtered and washed with benzene and alcohol. It is a rather dull brownish-red pigment, which is obtained in a yield of 5.4 parts. By analysis it contains 5.1% chlorine, as compared with a theoretical value of 6.5% for a monochloro derivative. This product is 2-(1'-amino-2'-anthraquinonyl-4'-chloro)-5-(1''-amino-2''-anthraquinonyl)-1,3,4-oxdiazole, having the following formula:

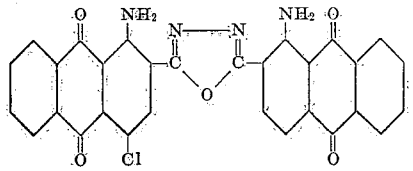

*Example 3*

A mixture of 23 parts of 2,5-di (1'-amino-2'-anthraquinonyl)-1,3,4-oxdiazole, one part of iodine, 23 parts of bromine and 300 parts of nitrobenzene is heated to 100–110° C. and held at this temperature for 16 hours. The uniform red crystals which form are filtered off and washed with benzene and alcohol. The product is a bright scarlet red which is slightly less bright than the dichloro derivative prepared according to Example 1. It dyes cotton in wine red shades from a wine red vat. The preparation yields 28 parts of material which contains by analysis 21% bromine. The theoretical bromine content of the dibromo derivative is 23.8%. The product is 2,5-di(1'-amino-2-anthraquinonyl-4'-bromo)-1,3,4-oxdiazole, the formula of which is:

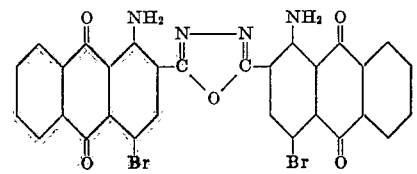

*Example 4*

A mixture of 5.1 parts of 2,5-di (1'-amino-2'-anthraquinonyl)-1,3,4-oxdiazole with 10.7 parts of N-bromo-succinimide and 50 parts of nitrobenzene is heated to 180° C. Long thin red needles gradually separate and are removed by filtration. 4.9 parts of product are obtained, which contains 21.8% bromine and which dyes cotton a wine-red shade from a wine-red vat.

I claim:

1. 2,5-di (1'-amino-2'-anthraquinonyl)-1,3,4-oxdiazoles which carry in at least one of the anthraquinone radicals in the 4' position a substituent from the group consisting of chlorine and bromine.

2. 2,5-di (1'-amino-2'-anthraquinonyl-4'-chloro)-1,3,4-oxdiazole.

3. 2,5-di (1'-amino-2'-anthraquinonyl-4'-bromo)-1,3,4-oxdiazole.

4. 2-(1'-amino-2'-anthraquinonyl-4'-chloro)-5-(1''-amino-2''-anthraquinonyl)-1,3,4-oxdiazole.

FREDERIC B. STILMAR.

References Cited in the file of this patent
UNITED STATES PATENTS

| Number | Name | Date |
|---|---|---|
| 2,415,937 | Deinert | Feb. 18, 1947 |
| 2,464,831 | Stilmar | Mar. 22, 1949 |